United States Patent
Adler

(10) Patent No.: US 10,071,319 B2
(45) Date of Patent: Sep. 11, 2018

(54) EULER DISC

(71) Applicant: Alan J. Adler, Los Altos, CA (US)

(72) Inventor: Alan J. Adler, Los Altos, CA (US)

(73) Assignee: AEROPRESS, INC., Palo Alto, CA (US)

( * ) Notice: Subject to any disclaimer, the term of this patent is extended or adjusted under 35 U.S.C. 154(b) by 0 days.

(21) Appl. No.: 14/318,337

(22) Filed: Jun. 27, 2014

(65) Prior Publication Data

US 2015/0375126 A1  Dec. 31, 2015

(51) Int. Cl.
*A63H 1/00* (2006.01)
*G09B 23/06* (2006.01)

(52) U.S. Cl.
CPC ............. *A63H 1/00* (2013.01); *G09B 23/06* (2013.01)

(58) Field of Classification Search
CPC ............. A63H 1/00; A63H 33/18; A63F 9/02
See application file for complete search history.

(56) References Cited

U.S. PATENT DOCUMENTS

| | | | |
|---|---|---|---|
| 336,179 A | | 2/1886 | Vogelsang |
| 483,895 A | * | 10/1892 | Buckley ............... A63F 7/0005 |
| | | | 273/126 R |
| 810,224 A | | 1/1906 | Sackett |
| 1,119,673 A | * | 12/1914 | Bellamy ............... A63F 7/0005 |
| | | | 273/126 R |
| 1,145,457 A | * | 7/1915 | Anderson ................ A63F 9/16 |
| | | | 273/108 |
| 2,269,941 A | * | 1/1942 | Jones ..................... A63B 67/00 |
| | | | 273/126 R |
| 3,544,113 A | | 12/1970 | Hand |
| 4,165,580 A | * | 8/1979 | Miura .................... A63H 33/18 |
| | | | 124/5 |
| 5,833,240 A | * | 11/1998 | Barbour ............. A63F 3/00574 |
| | | | 273/282.1 |
| 5,853,172 A | * | 12/1998 | Yetken .................. A63F 7/0668 |
| | | | 273/108.5 |
| 5,863,235 A | * | 1/1999 | Bendik, Jr. .............. A63H 1/00 |
| | | | 446/219 |
| 6,761,355 B1 | * | 7/2004 | Lemieux ............. A63F 3/00697 |
| | | | 273/126 R |
| 2003/0134561 A1 | * | 7/2003 | Fontaign ................ A63H 33/18 |
| | | | 446/46 |
| 2005/0130775 A1 | * | 6/2005 | Hylak .................... A63B 67/04 |
| | | | 473/588 |
| 2013/0345001 A1 | * | 12/2013 | Pona ...................... A63B 67/14 |
| | | | 473/588 |

* cited by examiner

*Primary Examiner* — Gene Kim
*Assistant Examiner* — Alyssa Hylinski
(74) *Attorney, Agent, or Firm* — Kilpatrick Townsend & Stockton, LLP

(57) ABSTRACT

An Euler disc comprises a metal disc body having a maximum radius, an upper surface, a lower surface, a circular polished rounded edge joining the upper surface and the lower surface, and a maximum thickness. The upper surface is formed so that the cross-sectional area of the disc body that is above a horizontal bisector line and outside of a vertical quarter line drawn at one half of the maximum radius is less than 75% of the cross-sectional area of the disc body that is below the horizontal bisector line and outside of the vertical quarter line.

19 Claims, 5 Drawing Sheets

EULER DISC

BACKGROUND OF THE INVENTION

A cylindrical metal disc, such as a coin, can be spun on a smooth surface. The spinning motion becomes a combination of spinning and rolling. Many physicists have studied the motion of such discs which they have named Euler Discs. All articles on such discs which were found by the present inventor referred to cylindrical discs in which the thickness at the perimeter is substantially equal to the maximum thickness.

U.S. Pat. No. 5,863,235 describes a steel cylindrical Euler disc. It has a thickness at the perimeter substantially equal to its maximum thickness. The claims of this patent are entirely restricted to the decoration on the upper surface of the disc.

SUMMARY OF THE INVENTION

Embodiments of the invention provide an Euler disc that can provide substantially longer spin times than conventional cylindrical Euler discs. The term "Euler disc" or "disc" is used more broadly than the common interpretation that a disc is a circular cylinder (typically having a height that is less than the radius). Rather, discs according to embodiments of the present invention are not circular cylinders. They are, however, preferably rotationally symmetric (or axisymmetric), but need not be figures of rotation.

In this context, a two-dimensional shape is said to be rotationally symmetric (or axisymmetric) if it is can be rotated about an axis by at least one angle (less than 360 degrees) and still look the same. For example, regular polygons are axisymmetric (as are circles). A solid body is said to be axisymmetric if all of its cross-sections in planes perpendicular to its axis are axisymmetric.

In this context, a figure of rotation is a solid shape that results from sweeping a two-dimensional shape in a plane around an axis in the plane. Thus a figure of rotation can be rotated about its axis by any angle and look the same. For example, any solid shape that could be turned on a lathe is a figure of rotation.

A disc according to embodiments of the present invention has a metal disc body that has a maximum radius, and upper and lower surfaces that are joined by a circular polished rounded lower edge. In the case of a two-dimensional shape that is axisymmetric, the "maximum radius" is defined as the radius of the smallest circumscribing circle. For a solid shape characterized by axis of rotation, the maximum radius is the radius of the smallest circumscribing coaxial cylinder.

The lower surface is preferably generally flat, and the upper surface can have a wide variety of configurations. In many configurations, the upper surface is formed so that the disc is thinnest at the perimeter. It is possible, however, for the disk to be thicker at the perimeter than it is at some other points. For example, an upstanding flange or lip could be formed.

As used in this application, the term upper surface is broadly defined to include substantially the entire surface above the rounded lower edge, even if portions of the upper surface are vertical or even face downwardly. In some embodiments, the upper surface has multiple visually demarked upper and lower portions (e.g., a conical, frusto-conical, spheroidal, or stepped upper portion and a cylindrical lower portion). In other embodiments, the upper surface is not divided into visually demarked portions.

The present inventor has discovered that substantially longer spin times are achieved when the upper surface of the disc is formed such that the cross-sectional area above a horizontal bisector line and outside of a vertical reference line drawn at one half of the maximum radius is less than 75%, or even less than 50%, of the cross-sectional area below the bisector line and outside of the same vertical reference line.

Where the disc is a figure of rotation, all the vertical cross-sections are the same, so it doesn't matter which cross-section plane is used to measure the cross-sectional area ratio. Where the disk is not a figure of rotation, not all vertical cross-sections are the same. To avoid ambiguity, the cross-section plane used to measure the cross-sectional area ratio is defined to be one of the cross-section planes of minimum cross-sectional area above the bisector line.

In an aspect of the invention, an Euler disc comprises a metal disc body having a maximum radius, an upper surface, a lower surface, a circular polished rounded lower edge joining the upper surface and the lower surface, and a maximum thickness. The upper surface is formed such that the cross-sectional area of the disc that is above a horizontal bisector line defining one half of the maximum thickness, and outside of a vertical quarter line drawn at one half the maximum radius, is less than 75% of the cross-sectional area of the disc that is below the horizontal bisector line and outside of the vertical quarter line.

In some embodiments, the upper surface comprises visually distinct upper and lower portions (the lower portion can be cylindrical). The upper surface can take on many forms, for example, at least a portion of the upper surface can be formed as a cone, or as the frustum of a cone, or as multiple frustums of cones, or as a series of steps, or as, or as a convex curved surface.

In another aspect of the invention, a method of spinning an Euler disc comprises: providing an Euler disc that comprises a metal disc body having a maximum radius, an upper surface, a lower surface, a circular polished rounded lower edge joining the upper surface and the lower surface, and a maximum thickness. The upper surface is formed such that the cross-sectional area of the disc that is above a horizontal bisector line and outside of a vertical quarter line drawn at one half of the maximum radius is less than 75% of the cross-sectional area of the disc that is below the horizontal bisector line and outside of the vertical quarter line. The method further comprises orienting the plane of the disc vertically with the lowest point on the perimeter contacting a hard, smooth surface; and twirling the disc like a top.

In another aspect of the invention, a method of spinning an Euler disc comprises: providing an Euler disc that comprises a metal disc body having a maximum radius, an upper surface, a lower surface, a circular polished rounded lower edge joining the upper surface and the lower surface, and a maximum thickness. The upper surface is formed such that the cross-sectional area of the disc that is above a horizontal bisector line and outside of a vertical quarter line drawn at one half of the maximum radius is less than 75% of the cross-sectional area of the disc that is below the horizontal bisector line and outside of the vertical quarter line. The method further comprises orienting the plane of the disc at an inclined angle with the lowest point on the polished edge contacting a hard, smooth surface; and rocking the disc with an axis of rocking rotation approximately parallel to the inclined plane of the disc.

A further understanding of the nature and advantages of the present invention may be realized by reference to the remaining portions of the specification and the drawings, which are intended to be exemplary and not limiting.

DESCRIPTION OF SPECIFIC EMBODIMENTS

The invention provides an Euler disc that can be spun by a user. The drawings show various embodiments of the disc lying in a horizontal plane, and the elements are described relative to that orientation.

As will be described below, the disc has circular polished rounded lower edge that contacts a stationary supporting surface during spin. Two alternative methods of spinning the disc are described below:

a) The plane of the disc is oriented vertically with the lowest point on the perimeter contacting a hard, smooth surface, and twirled like a top. The disc will spin for a while, then lean over on its polished edge and continue to move in a rotating, rolling motion. Motions exceeding five minutes have been observed with embodiments of the present invention.

b) The plane of the disc is oriented at an inclined angle with the lowest point on the disc's edge contacting a hard, smooth surface, and rocked with an axis of rocking rotation approximately parallel to the inclined plane of the disc. The disc will immediately begin to move in a rotating, rolling motion. Motions exceeding five minutes have been observed with embodiments of the present invention.

Figure 1:
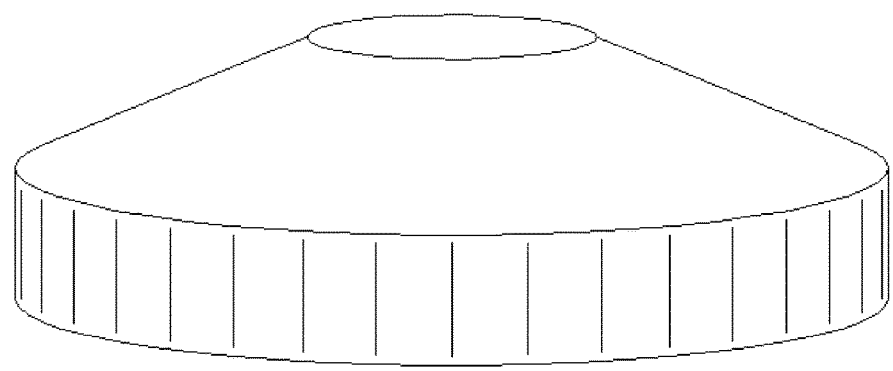
FIG. 1 is a perspective view of an Euler disc having an upper surface that includes a frustoconical upper portion, and a cylindrical lower portion according to an embodiment of the invention.
Figure 2:
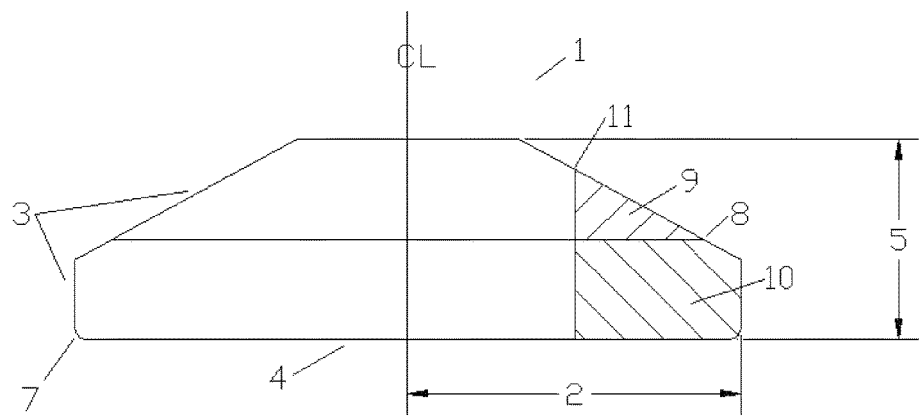
FIG. 2 is a cross-section of a disc similar to the disc of FIG. 1.

FIGS. 1 and 2 are perspective and cross-sectional views, respectively, of an Euler disc 1 according to an embodiment of the invention. Disc 1 has a disc body having a maximum radius 2, an upper surface 3, a lower surface 4, a maximum thickness 5, and a circular polished rounded lower edge 7 joining the disc's upper surface 3 and lower surface 4. A central axis is denoted with a legend CL. The present inventor has discovered that long spin times are achieved when upper surface 3 is formed to reduce the thickness of the disc body toward the perimeter (although the disc is not necessarily thinnest at the perimeter).

As an aid to quantifying the degree to which the thickness of the disc body at the perimeter is reduced, two lines are drawn in the plane of the cross-sectional view. A reference horizontal bisector line 8 is drawn at one half of maximum thickness 5, and reference vertical quarter line 11 is drawn at one half of maximum radius 2. The inventor has found that long spin times are achieved when upper surface 3 is formed such that the cross-sectional area 9 that is above horizontal bisector line 8 and outside of vertical quarter line 11 is less than 75% of the cross-sectional area 10 that is below the horizontal bisector line and outside of the vertical quarter line. The longest spin times have been observed for discs having an upper cross-sectional area which is less than 50% of the lower cross-sectional area.

As mentioned above, for discs that are not figures of rotation, the cross-section plane used to measure the ratio of the cross-sectional areas is one of the cross-section planes of minimum cross-sectional area above the bisector line.

For purposes of this disclosure, the upper surface is defined as the entire surface above lower edge 7. In this particular embodiment, the disc is formed as a frustum of a cone overlying a cylinder. Thus, the disc's upper surface 3 has a frustoconical upper portion, and visually distinct cylindrical lower portion. In this embodiment, the cross-sectional area 9 is 29% of the cross-sectional area 10 (compared to 100% for cylindrical discs).

Lower surface 4 of the disc is preferably flat or nearly flat. Acceptable departures from flat can include a slightly textured surface, a slightly indented surface, a slightly concave surface, or a slightly convex surface. Since the disc lies flat when its spin ends, the center of any disc having a slightly convex lower surface will touch a flat supporting surface and stop spinning a few seconds sooner than will the lower surface of discs having a flat or concave lower surfaces.

The upper surfaces of embodiments described below with reference to FIGS. 3, 4, 5, and 6 also have cylindrical lower portions, and differ primarily in the respective shapes of their upper portions. The upper surfaces of embodiments described below with reference to FIGS. 7 and 8 do not have such cylindrical lower portions, but rather are continuous and smooth curves. Thus, while the upper surface would inherently have upper and lower portions, the upper and lower portions may have a visual demarcation, or one may blend into the other so that there is no visual demarcation. The upper surface of the embodiment described below with reference to FIGS. 9A and 9B differs from the other embodiments in that it is not a figure of rotation, although it is axisymmetric like the other embodiments.

Variations on the cylindrical (lower) portion of the upper surface can include a surface that has a slight bulge like a barrel (i.e., is slightly convex), or a surface that has a slight waist (i.e., is slightly concave). An additional possible variation on the cylindrical portion of the upper surface is a frustoconical surface.

It is preferred that the disc be made of a heavy metal. Copper, brass, and steel are all suitably heavy, however hard steel is preferred for durability. Scratches or nicks in polished rounded lower edge 7 reduce spin time. Thus hardened steel is preferred. Durability can be further improved with a plating such as hard chrome or a hard engineered coating such as titanium nitride. If such a coating were used, the coating would only need to be applied to edge 7.

While a uniform body (possibly with a hard coating) of the selected metal is the simplest, there is nothing preventing composite structures including multiple materials. Hollow structures are also possible, but are unlikely to improve the spin time.

Figure 3:
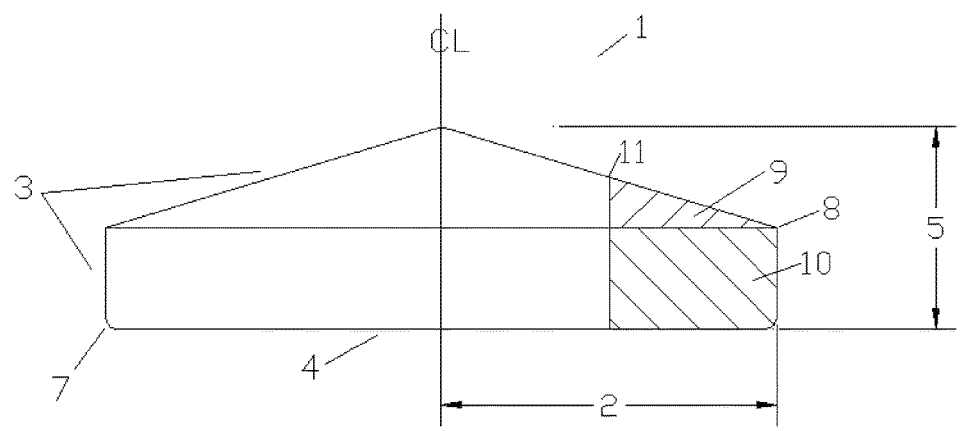
FIG. 3 is a cross-section of an Euler disc having an upper surface that includes a conical upper portion and a cylindrical lower portion according to an alternative embodiment of the invention.

FIG. 3 is a cross-section of an Euler disc whose upper surface 3 has a conical upper portion, and a cylindrical lower portion. In this embodiment, the upper cross-sectional area 9 is 25% of the lower cross-sectional area 10.

Figure 4:
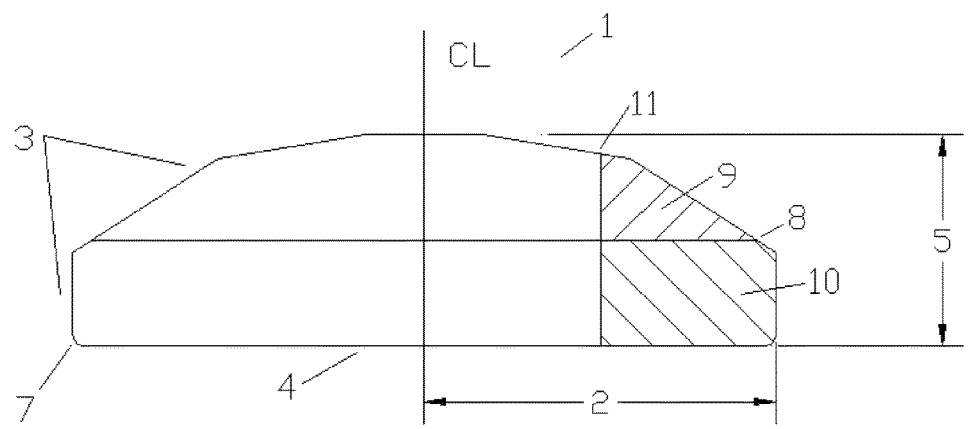
FIG. 4 is a cross-section of an Euler disc having an upper surface that includes an upper portion defined by multiple frustoconical regions, and a cylindrical lower portion according to an alternative embodiment of the invention.

FIG. 4 is a cross-section of an Euler disc whose upper surface 3 defined by multiple frustoconical regions, and a cylindrical lower portion. In this embodiment, the upper cross-sectional area 9 is 42% of the lower cross-sectional area 10.

Figure 5:
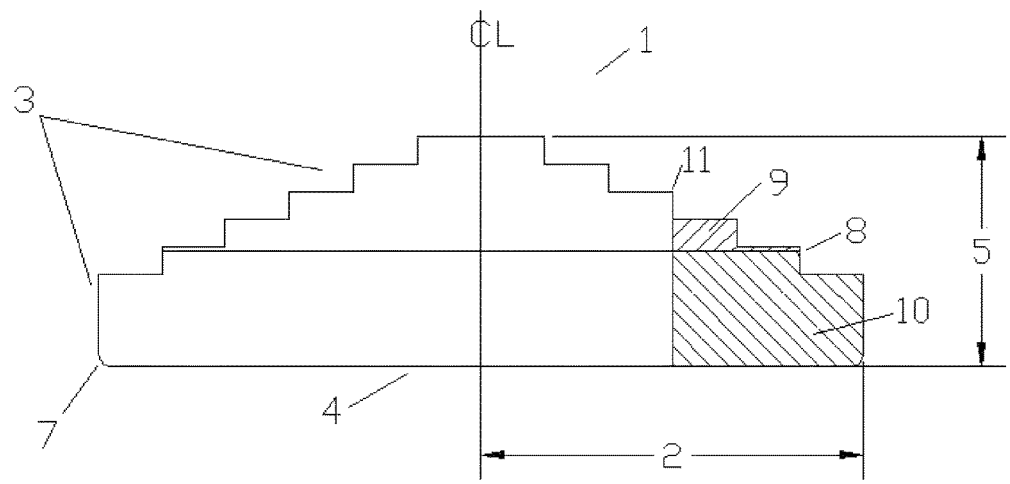
FIG. 5 is a cross-section of an Euler disc having an upper surface formed as a series of steps, and a cylindrical lower portion according to an alternative embodiment of the invention.

FIG. 5 is a cross-section of an Euler disc whose upper surface 3 has an upper portion formed as a series of steps, and a cylindrical lower portion. In this embodiment, the upper cross-sectional area 9 is 11% of the lower cross-sectional area 10.

Figure 6:
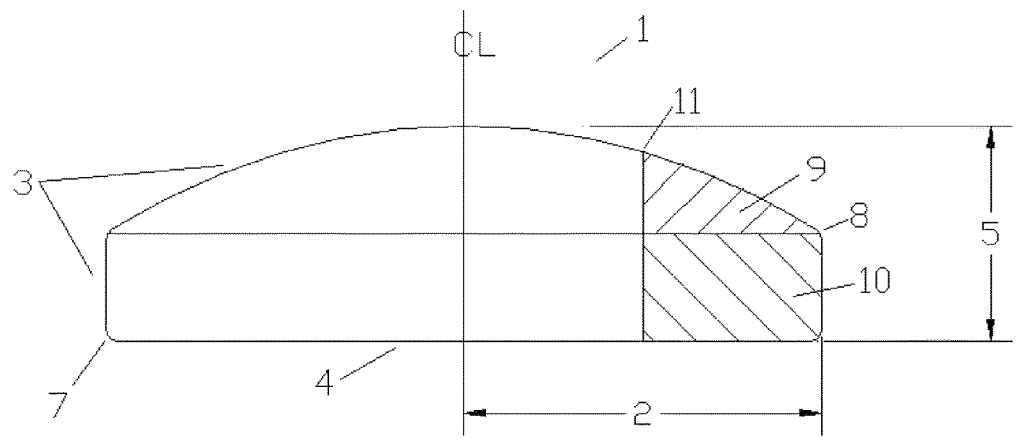
FIG. 6 is a cross-section of an Euler disc having a convex curved upper portion, and a cylindrical lower portion according to an alternative embodiment of the invention.

FIG. 6 is a cross-section of an Euler disc whose upper surface 3 has a convex curved upper portion, and a cylindrical lower portion. For example, the upper portion of the upper surface could be defined by an oblate spheroid that is truncated significantly above its medial plane. In this embodiment, the upper cross-sectional area 9 is 43% of the lower cross-sectional area 10.

Figure 7:
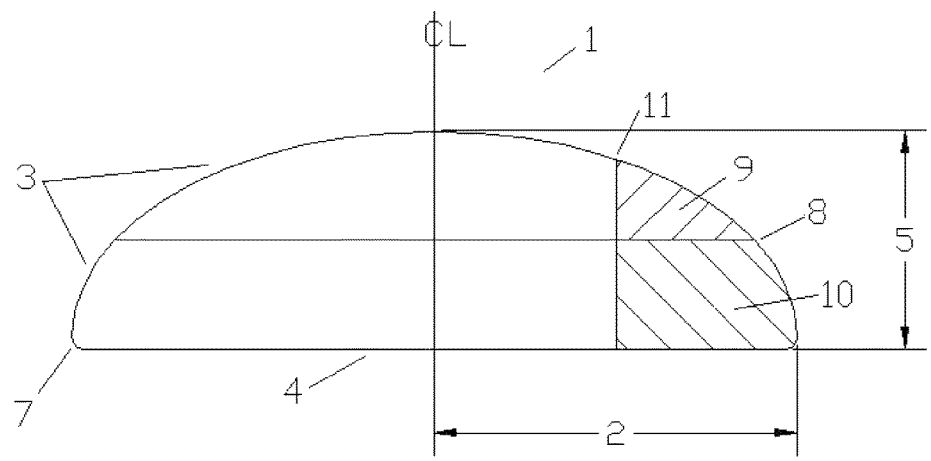
FIG. 7 is a cross-section of an Euler disc having an upper surface substantially all of which is a convex curved surface according to an alternative embodiment of the invention.

FIG. 7 is a cross-section of an Euler disc, which like the embodiment of FIG. 6, has a convex curved upper surface (e.g., a truncated oblate spheroid), but unlike the embodiments shown in FIGS. 1 through 6, there is no circumferentially extending vertical cylindrical surface. Rather, the convex curved upper surface continues outwardly and joins rounded lower edge 7 at the periphery. For example, the upper surface could be defined by an oblate spheroid that is truncated at its medial plane and terminates with a vertical tangent at the top of rounded edge 7. In the embodiment of FIG. 7, the upper cross-sectional area 9 is 36% of the lower cross-sectional area 10.

Figure 8:
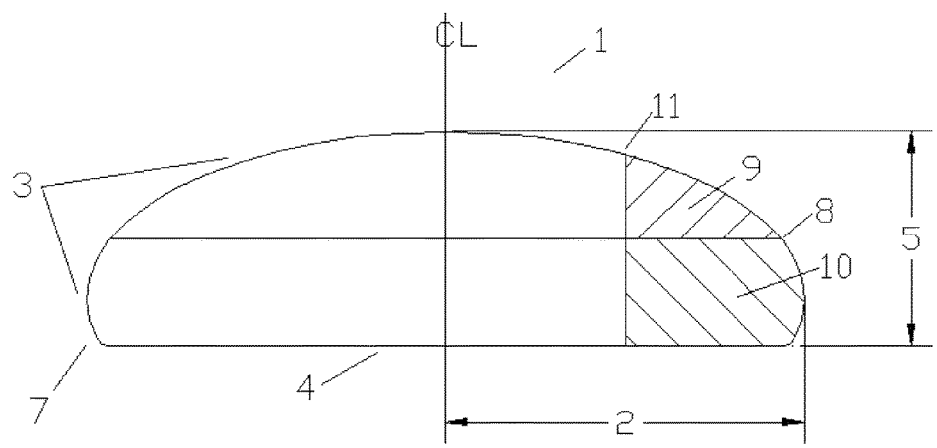
FIG. 8 is a cross-section of an Euler disc having an upper surface substantially all of which is a convex curved surface according to an alternative embodiment of the invention.

FIG. 8 is a is a cross-section of an Euler disc that also has a convex curved upper surface (e.g., a truncated oblate spheroid), and like the embodiment of FIG. 7, has no circumferentially extending vertical cylindrical surface. Rather, the convex curved upper surface continues outwardly, then turns inwardly, and joins rounded lower edge 7 inboard of the periphery. For example, the upper surface could be defined by an oblate spheroid that is truncated below its medial plane so that its tangent is sloped where it meets rounded edge 7. In the embodiment of FIG. 8, the upper cross-sectional area 9 is 44% of the lower cross-sectional area 10.

Thus, FIGS. 7 and 8 represent examples of Euler discs where the upper surface consists only of a curved surface. In the variant of FIG. 7, the upper surface is generally vertical where it joins rounded edge 7. In the variant of FIG. 8, the upper surface is actually facing downwardly where it joins rounded edge 7. However, it will be appreciated that there is no fundamental difference between embodiments having a cylindrical peripheral wall and those not having one. Since, it was mentioned that the cylindrical lower portion of the upper surface 3 could bulge outwardly, the embodiment of FIG. 8 could be viewed as a variant of the embodiment of FIG. 6 where the "cylindrical" surface bulges outwardly.

For the embodiments of FIGS. 1 and 2, 3, 4, and 6, all the outwardly facing normals on the upper surface's upper portion have an upward vertical component. For the embodiment of FIG. 5 (stepped upper portion), the upper surface's upper portion has (a) regions where all outwardly facing normals are generally vertical, alternating with (b) regions where all outwardly facing normals are generally horizontal. In all these embodiments, all outwardly facing normals on the upper surface's cylindrical lower portion are horizontal. It is noted that the embodiment of FIG. 8 has a region of its upper surface abutting the lower edge where all the outwardly facing normals have a downward vertical component.

Figure 9A:
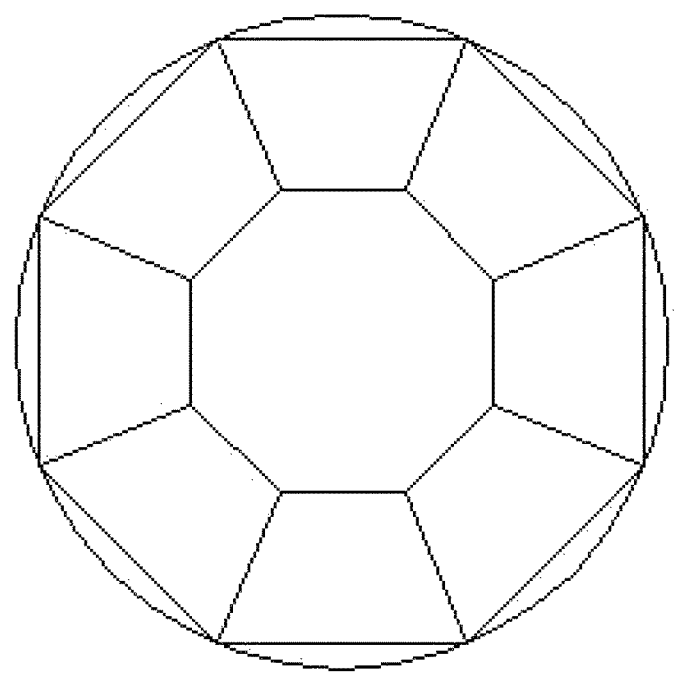
FIGS. 9A and 9B are top and side views of an Euler disc with a polygonal mid-perimeter which blends into its circular edge.
Figure 9B:
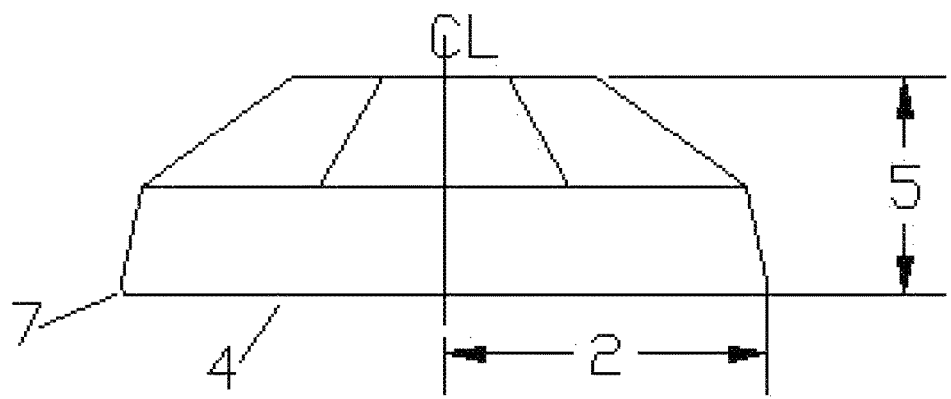

The embodiments discussed above in connection with FIGS. 1 through 8, whether or not they have visually distinct portions of their upper surfaces, are figures of rotation (they have circular symmetry, i.e., the disc body looks the same from all angles). FIGS. 9A and 9B, on the other hand, show an Euler disc that is not a figure of rotation.

FIGS. 9A and 9B are top and side views of an Euler disc having a polygonal mid-perimeter (perimeter shape at half the maximum thickness), and the portion of the upper surface above the mid-perimeter is faceted. While it is desirable that the perimeter of the disc be axisymmetric, it need not be circular. For example it may be a polygon, or a knurled circle which is blended into circular polished rounded lower edge 7. Furthermore the smooth upper surfaces of these examples could be faceted with no degradation in function. In this example the polygonal mid-perimeter is blended outward to meet circular lower edge 7.

An exemplary embodiment of the invention is a steel disc similar to the disc shown in FIGS. 1 and 2 having the following approximate dimensions: A maximum radius of 29 mm and a maximum thickness of 19 mm. The cylindrical portion is 9 mm high and the flat top has a radius of 15 mm. The polished rounded lower edge has a curvature of 1 mm. A steel disc of these dimensions has spun for over five minutes many times on the slightly concave surface of a glass magnifying mirror. At the time of this filing, the longest spin observed with this disc was 5 minutes and 54 seconds. As described above, possible configurations of the upper surface include conical regions, one or more frustoconical regions, and convex curved regions. Other configurations are possible, including combinations of the above-listed configurations.

The disc can be spun on any smooth surface, such as a wooden table, but longest spins are achieved on a hard polished surface such as glass.

While the above is a complete description of specific embodiments of the invention, the above description should not be taken as limiting the scope of the invention as defined by the claims.

What is claimed is:

1. An Euler disc toy capable of moving on a smooth surface with a combination of a spinning and rolling motion to provide user amusement, the Euler disc toy comprising:
   a solid steel disc body having
      a maximum radius,
      an upper surface,
      a lower surface,
      an axisymmetric perimeter,
      a circular polished rounded lower edge joining said upper surface and said lower surface,
      a maximum thickness,
      a reference horizontal bisector line defining one half of said maximum thickness, and
      a reference vertical quarter line defining one half of said maximum radius;
   wherein said upper surface is formed such that the cross-sectional area of said disc body that is above said horizontal bisector line and outside of said vertical quarter line is less than 75% of the cross-sectional area of said disc body that is below said horizontal bisector line and outside of said vertical quarter line so that a first thickness of said solid steel disc body at said axisymmetric perimeter is reduced relative to a second thickness in a center of the disc and the maximum radius is greater than the maximum thickness; and wherein when the Euler disc is set in motion, with said circular polished rounded lower edge in contact with the smooth surface, the Euler disc toy will move with the spinning and rolling motion for at least several minutes to provide user amusement.

2. The Euler disc of claim 1 wherein the cross-sectional area of said disc body that is above said horizontal bisector line and outside of said vertical quarter line is less than 50% of the cross-sectional area of said disc that is below said horizontal bisector line and outside of said vertical quarter line.

3. The Euler disc of claim 1 wherein said upper surface comprises visually distinct upper and lower portions.

4. The Euler disc of claim 3 wherein:
all points on the upper portion have outwardly facing normals that have a vertical component; and
the lower portion is in the form of a circumferentially extending vertical cylindrical surface with upper and lower edges, with said upper edge terminating at said upper portion and said lower edge of said lower portion terminating at said rounded lower edge.

5. The Euler disc of claim 1 wherein at least a portion of said upper surface is formed as a cone.

6. The Euler disc of claim 1 wherein at least a portion of said upper surface is formed as the frustum of a cone.

7. The Euler disc of claim 1 wherein at least a portion of said upper surface is formed as multiple frustums of cones.

8. The Euler disc of claim 1 wherein at least a portion of said upper surface is formed as a series of steps.

9. The Euler disc of claim 1 wherein at least a portion of said upper surface is formed as a convex curved surface.

10. The Euler disc of claim 1 wherein substantially all of said upper surface is formed as a convex curved surface.

11. The Euler disc of claim 1 wherein said solid steel disc body is made of a single metal.

12. The Euler disc of claim 1 wherein said solid steel disc body includes a hard coating covering at least said rounded lower edge.

13. The Euler disc of claim 1 wherein said lower surface is flat or nearly flat.

14. An Euler disc capable of spinning on a smooth surface with a combination of a spinning and rolling motion, the Euler disc comprising:

a solid steel disc body having
 a maximum radius,
 an upper surface,
 a lower surface,
 an axisymmetric perimeter,
 a circular polished rounded lower edge joining said upper surface and said lower surface; wherein said circular polished rounded lower edge has a curvature of about 1 mm,
 a maximum thickness,
 a reference horizontal bisector line defining one half of said maximum thickness, and
 a reference vertical quarter line defining one half of said maximum radius;

wherein said upper surface is formed such that the cross-sectional area of said disc body that is above said horizontal bisector line and outside of said vertical quarter line is less than 75% of the cross-sectional area of said disc body that is below said horizontal bisector line and outside of said vertical quarter line so as to reduce a first thickness of said solid steel disc body at said axisymmetric perimeter relative to a second thickness in a center of the disc; and wherein when the Euler disc is set in motion on a smooth hard surface, the Euler disc will move with the spinning and rolling motion, supported by said circular polished rounded lower edge, for several minutes.

15. The Euler disc of claim 14 wherein said lower surface is flat or nearly flat.

16. The Euler disc of claim 14 wherein the cross-sectional area of said disc body that is above said horizontal bisector line and outside of said vertical quarter line is less than 50% of the cross-sectional area of said disc that is below said horizontal bisector line and outside of said vertical quarter line.

17. The Euler disc of claim 14 wherein said upper surface comprises visually distinct upper and lower portions.

18. The Euler disc of claim 14 wherein:
all points on the upper portion have outwardly facing normals that have a vertical component; and
the lower portion is in the form of a circumferentially extending vertical cylindrical surface with upper and lower edges, with said upper edge terminating at said upper portion and said lower portion terminating at said rounded lower edge.

19. The Euler disc of claim 14 wherein at least a portion of said upper surface is formed as the frustum of a cone.

\* \* \* \* \*

UNITED STATES PATENT AND TRADEMARK OFFICE
CERTIFICATE OF CORRECTION

| | |
|---|---|
| PATENT NO. | : 10,071,319 B2 |
| APPLICATION NO. | : 14/318337 |
| DATED | : September 11, 2018 |
| INVENTOR(S) | : Alan J. Adler |

It is certified that error appears in the above-identified patent and that said Letters Patent is hereby corrected as shown below:

On the Title Page

Title, and in the Specification, Column 1, replace "Euler disc" with --Spinning/rolling disc--.

Abstract, Line 1, replace "An Euler disc" with --A disc for spinning/rolling--.

In the Specification

Column 1, Lines 8-9, replace "such discs which they have named Euler Discs." with --such discs, which are sold as a toy under the trademark EULER DISK by Toysmith Group of Sumner, Washington.--.

Column 1, Line 13, replace "cylindrical Euler" with --cylindrical--.

Column 1, Line 20, replace "an Euler disc" with --a disc--.

Column 1, Line 22, replace "cylindrical Euler discs" with --cylindrical spinning/rolling discs--.

Column 1, Line 22, replace "term "Euler disc"" with --term "spinning/rolling disc"--.

Column 2, Line 15, replace "an Euler disc" with --a spinning/rolling disc--.

Column 2, Line 35, replace "an Euler disc comprises: providing an Euler disc" with --a spinning/rolling disc comprises: providing a disc--.

Column 2, Line 50, replace "an Euler disc comprises: providing an Euler disc" with --a spinning/rolling disc comprises: providing a disc--.

Column 3, Line 6, replace "an Euler disc" with --a spinning/rolling disc--.

Signed and Sealed this
Twenty-eighth Day of April, 2020

Andrei Iancu
*Director of the United States Patent and Trademark Office*

CERTIFICATE OF CORRECTION (continued)
U.S. Pat. No. 10,071,319 B2

Column 3, Line 12, replace "an Euler disc" with --a spinning/rolling disc--.

Column 3, Line 16, replace "an Euler disc" with --a spinning/rolling disc--.

Column 3, Line 20, replace "an Euler disc" with --a spinning/rolling disc--.

Column 3, Line 24, replace "an Euler disc" with --a spinning/rolling disc--.

Column 3, Line 27, replace "an Euler disc" with --a spinning/rolling disc--.

Column 3, Line 30, replace "an Euler disc" with --a spinning/rolling disc--.

Column 3, Line 34, replace "an Euler disc" with --a spinning/rolling disc--.

Column 3, Line 40, replace "an Euler disc" with --a spinning/rolling disc--.

Column 3, Line 64, replace "an Euler disc" with --a spinning/rolling disc--.

Column 5, Line 8, replace "an Euler disc" with --a spinning/rolling disc--.

Column 5, Line 12, replace "an Euler disc" with --a spinning/rolling disc--.

Column 5, Line 17, replace "an Euler disc" with --a spinning/rolling disc--.

Column 5, Line 22, replace "an Euler disc" with --a spinning/rolling disc--.

Column 5, Line 29, replace "an Euler disc" with --a spinning/rolling disc--.

Column 5, Line 41, replace "an Euler disc" with --a spinning/rolling disc--.

Column 5, Line 53, replace "an Euler disc" with --a spinning/rolling disc--.

Column 6, Line 17, replace "an Euler disc" with --a spinning/rolling disc--.

In the Claims

Column 6, Claim 1, Line 1, replace "An Euler disc" with --A spinning/rolling disc--.

Column 7, Claim 2, Line 1, replace "The Euler disc" with --The spinning/rolling disc--.

Column 7, Claim 3, Line 1, replace "The Euler disc" with --The spinning/rolling disc--.

Column 7, Claim 4, Line 1, replace "The Euler disc" with --The spinning/rolling disc--.

Column 7, Claim 5, Line 1, replace "The Euler disc" with --The spinning/rolling disc--.

CERTIFICATE OF CORRECTION (continued)
U.S. Pat. No. 10,071,319 B2

Column 7, Claim 6, Line 1, replace "The Euler disc" with --The spinning/rolling disc--.

Column 7, Claim 7, Line 1, replace "The Euler disc" with --The spinning/rolling disc--.

Column 7, Claim 8, Line 1, replace "The Euler disc" with --The spinning/rolling disc--.

Column 7, Claim 9, Line 1, replace "The Euler disc" with --The spinning/rolling disc--.

Column 7, Claim 10, Line 1, replace "The Euler disc" with --The spinning/rolling disc--.

Column 7, Claim 11, Line 1, replace "The Euler disc" with --The spinning/rolling disc--.

Column 7, Claim 12, Line 1, replace "The Euler disc" with --The spinning/rolling disc--.

Column 7, Claim 13, Line 1, replace "The Euler disc" with --The spinning/rolling disc--.

Column 7, Claim 14, Line 1, replace "The Euler disc" with --The spinning/rolling disc--.

Column 8, Claim 15, Line 1, replace "The Euler disc" with --The spinning/rolling disc--.

Column 8, Claim 16, Line 1, replace "The Euler disc" with --The spinning/rolling disc--.

Column 8, Claim 17, Line 1, replace "The Euler disc" with --The spinning/rolling disc--.

Column 8, Claim 18, Line 1, replace "The Euler disc" with --The spinning/rolling disc--.

Column 8, Claim 19, Line 1, replace "The Euler disc" with --The spinning/rolling disc--.